UNITED STATES PATENT OFFICE.

JOKICHI TAKAMINE, OF PEORIA, ILLINOIS.

PROCESS OF MAKING DIASTATIC ENZYME.

SPECIFICATION forming part of Letters Patent No. 525,823, dated September 11, 1894.

Application filed February 23, 1894. Serial No. 501,251. (No specimens.)

*To all whom it may concern:*

Be it known that I, JOKICHI TAKAMINE, a subject of the Emperor of Japan, residing at Peoria, in the county of Peoria and State of Illinois, have invented certain new and useful Improvements in Processes of Making Diastatic Enzyme; and I do hereby declare the following to be a full, clear, and exact description of the invention, such as will enable others skilled in the art to which it appertains to make and use the same.

The object of this invention is to prepare and manufacture diastatic enzyme, or soluble ferment in a concentrated form which possesses the power of transforming starch into sugar for use in various industries, by a process not hitherto practiced, and in a very economical and practical manner.

My invention is based upon the utilization of the property possessed by certain fungi during their growth on proper media of producing diastatic enzyme.

For the purpose of my invention, I use the microscopic fungus, *Eurotium oryzæ*, with the best results, but other mold fungi belonging to the genus *Aspergillus*, and to the genera *Mucor*, and *Pennecillium* may also be used. I use as the raw materials on which to grow the fungus, the comminuted or broken grains of cereals from which the greater part of starchy matter has been removed. The reason why I use this branny part of grain is, that they not only are materials practically and economically suited for the purpose of my invention, but also they have the following merits, viz: First. Being of a loose and coarse nature, they afford a large surface for the growth of the fungus, and a ready access of air, one of the necessary conditions to its growth. Second. Being rich in albuminoids and phosphates, they supply the most necessary ingredients for the production of the enzyme. Third. They contain a large percentage of woody fiber, which renders their use of special advantage in the process of extraction, as described below. Fourth. They are cheap and abundant, and in constant supply at all seasons of the year.

In carrying out my invention the bran is first moistened with water, so as to have from thirty to fifty per cent. of moisture. To it is then added about one one-thousandth part of its weight of the spores of the fungus and the mass is then well mixed. Before mixing in the spores, the bran may be steamed with live steam, in order to sterilize the mass, with the object of preparing the enzyme in a purer form. When the bran is not steamed, the product afterward obtained is liable to be contaminated with more of the foreign elements, but the quantity of the enzyme obtained from the unsteamed bran on which the fungi has been grown is larger and consequently the diastatic power is stronger, from the same amount of bran than where steamed bran is used. After thoroughly mixing with the spores of the fungus, the bran is placed in a room with the temperature ranging from 25° to 30° centigrade, and the air saturated or nearly saturated with moisture, the mass is spread out into thin layers of from one to four inches in thickness on the floor or shelves. The thickness of the layers is determined by the nature of the bran, and whether it is steamed or unsteamed. The mass being left in this condition gradually heats up, owing to the growth of the fungus. The condition of the air in the room is so regulated that the temperature of the mass is not allowed to go higher than about 40° centigrade. After from thirty to fifty hours, during which the mass is left undisturbed, the fungous growth has advanced to its greatest extent, and an abundant production of the enzyme has taken place. The mass thus obtained may be dried in any suitable way, as by the agency of dry air, taking care that the temperature is not permitted to rise to a degree which would injure the diastatic properties of the mass. From the dried or undried mass thus obtained, the diastatic enzyme is extracted by treating the same with water or water mixed with alcohol. This may be done by permitting the liquid to percolate through the mass, or by steeping the mass in the liquid. The strength of this solution may be increased by repeatedly treating a fresh quantity of the mass therewith. A solution containing from thirty to thirty-five per cent. of soluble solid matter may thus be readily obtained. The object of making the extract of such great strength as above described is to economize the quantity of alcohol to be used in the subsequent stage of the process described below. In order to further economize the alcohol to be used, I may also further concentrate the already strong extract by evaporation by suitable means at a temperature not to exceed 50° centigrade, that is, at a temperature at which the diastatic enzyme is not injured; so as to form a thick sirup or semi-solid. In this concentrated state also the water extract of the crude enzyme can be preserved without change, before precipitation with alcohol; and consequently the subsequent precipitation with alcohol is not required to be immediately proceeded with, as would be the case if weak watery extract were prepared. This solution may be still further concentrated and strengthened by evaporation at a low temperature into a sirupy form. To the solution thus obtained, a sufficient quantity, which is usually about one and a half to three times its volume of alcohol containing from ninety to ninety-five per cent. absolute alcohol by volume is added and agitated until the diastatic enzyme is precipitated. Floculent solid matter consisting mainly of diastatic enzyme, but also of traces of dextrine, mineral matter, &c., is precipitated. The precipitate may be allowed to settle, and is separated from the supernatant liquid by decantation and filtration or it may be wholly separated by filtration. It is then washed with alcohol containing eighty-five per cent. of absolute alcohol to free it from adhering materials. The mass can be dried slowly at a low temperature in a dry room, or may be dehydrated by strong alcohol, by which latter means the article can be at once obtained in a powdery form. The article may be purified further by re-dissolving it in water, and re-precipitating and washing it with alcohol and drying, thus repeating the process as above followed out in the first precipitation. The article thus obtained is an amorphous dry mass, or powder, of almost white or light yellowish brown color. It is readily soluble in water and possesses the power of transforming gelatinized starch into sugar.

The article is distinguished from malt diastase by its lack of the characteristic property of giving blue coloration with the tincture of guaiacum mixed with hydrogen peroxide. Instead of such blue coloration it gives a milky white coloration. The article obtained from the unsteamed bran, however, gives a blue coloration in a slight degree, owing to the fact that the raw cereals of which bran is a portion, originally contain a small portion of malt diastase, which is necessarily extracted in the above described process simultaneously with the diastatic enzyme, but which is destroyed in the case of steamed bran.

The alcoholic mother liquor contains a small quantity of unprecipitated diastatic enzyme which may be used again in admixture with fresh alcohol in treating fresh crude, diastatic enzyme solution. The use of this mother liquor in this way may be repeated, until the accumulation of the various substances contained in it impairs its efficiency, and then the alcohol contained can be recovered by distillation. The residue remaining after distillation contains a considerable quantity of sugars, which may be fermented and distilled for alcohol, or used for other purposes. The bran remaining after the extraction with water of the diastatic enzyme, may be pressed and dried for cattle food, or it may be used over again in the same manner as above described.

Instead of using all extract from the comminuted or broken grains of cereals with the greater part of starchy material removed therefrom and upon which the fungus has been grown, from which the diastatic enzyme may be precipitated with alcohol, I may also use the watery extract from a mixture in about equal proportions of the mass with the fungus grown thereon, and a mass of comminuted or broken grains of cereals from which the greater part of starchy material has been removed. This solution may be concentrated as above described, and precipitated. I have also discovered that satisfactory results may be obtained by using as the solution from which the diastatic enzyme is precipitated with alcohol, as above described, a mixture of the watery extracts obtained from about equal proportions of broken or comminuted grains of cereals from which the greater starchy part has been removed and upon which has been developed and propagated a fungous growth, and the raw material without such fungous growth thereupon. This solution in like manner may be evaporated into sirup or may be precipitated in solid form by the use alcohol.

I have also discovered that good results may be obtained by first obtaining a precipitate in the manner above described from the watery extract of a mass of material upon and throughout which the fungi has been developed and grown, and then obtaining a precipitate in the manner described, from the extract of a mass of raw material without the fungous growth thereon, and, finally, mixing thoroughly the two precipitates thus obtained.

I have also discovered that a valuable product is obtained by mixing together the concentrated sirup obtained from a mass of the comminuted or broken grains of cereals, from which the greater part of the starchy matter has been removed, and upon which has been developed and grown to a suitable extent the specified fungus under suitable conditions of temperature and humidity, and the concentrated sirup obtained from a mass of the raw material without such fungous growth thereon, as above described.

What I desire to claim as new, and to secure by Letters Patent of the United States, is—

1. The process of preparing and making diastatic enzyme which consists in mixing the comminuted or broken grains of cereals from which the greater part of starchy matter has been removed with the spores of the specified fungus, keeping the mass at the proper condition of temperature and humidity allowing the fungus to develop abundantly, then extracting the soluble matter with water, precipitating with alcohol, washing the precipitated solid matter with alcohol and drying, all substantially as described.

2. The process of preparing and making diastatic enzyme, which consists in mixing the spores of the specified fungus with comminuted or broken grains of cereals, from which the greater part of starchy matter has been removed, subjecting the mass thus obtained to the proper temperature and moisture, thus allowing the fungus to develop abundantly, then mixing with the mass thus obtained, in about the proportion specified a fresh mass of comminuted or broken grains of cereals, from which the greater part of starchy matter has been removed, then extracting from this mixture the soluble matter contained therein, then precipitating the solid matter contained in said extract, then washing said precipitate, and, finally, drying, all substantially, as and for the purpose specified.

3. The process of preparing and making diastatic enzyme, which consists in first extracting with water the soluble matter contained in a mass of comminuted or broken grains of cereals, from which the greater part of the starchy matter has been removed, and upon which has been developed and grown to a desired stage, under suitable conditions of temperature and moisture, a fungous growth as described; and, next, extracting with water the soluble matter contained in a mass of comminuted or broken grains of cereals, from which the greater part of starchy matter has been removed; next, thoroughly mixing the two extracts thus obtained, then precipitating with alcohol the solid matter contained in said mixture of said extracts, and, finally, drying said precipitate, all substantially as, and for the purpose set forth.

4. The process of preparing and making diastatic enzyme, which consists in extracting the soluble matter contained in a mass of comminuted or broken grains of cereals, from which the greater part of starchy matter has been removed, and upon which has been developed and grown to the required stage the specified fungus, under the proper conditions of temperature and humidity, then precipitating the solid matter contained in said extract, then drying said precipitate, and next extracting with water the soluble matter contained in a mass (in the proportion specified) of comminuted or broken grains of cereals, from which the greater part of starchy matter has been removed; next precipitating from the last mentioned extract the solid matter contained therein, then drying said precipitate, and, finally, washing with alcohol and mixing the two precipitates in the proportions specified, all substantially as and for the purpose specified.

5. The process of preparing and making diastatic enzyme in a crude form, which consists in mixing the comminuted or broken grains of cereals from which the greater part of starchy matter has been removed, with the spores of the specified fungus, keeping the mass at the proper condition of temperature and humidity, allowing the fungus to develop abundantly, then extracting the soluble matter with water, concentrating the extract by repeatedly treating fresh quantities of said mass therewith, and finally evaporating the extract, all substantially as described.

6. The process of preparing and making diastatic enzyme in a crude form, which consists in mixing the spores of the specified fungus with comminuted or broken grains of cereals from which the greater part of starchy matter has been removed, subjecting the mass thus obtained to the proper temperature and moisture, thus allowing the fungus to develop abundantly, mixing the mass thus obtained in about the proportions specified with a fresh mass of raw comminuted or broken grains of cereals, from which the greater part of starchy matter has been removed, then extracting with water from this mixture the soluble matter contained therein, concentrating the solution obtained by repeatedly treating fresh quantities of said mixture therewith and evaporating, all substantially as described.

7. The process of preparing and making diastatic enzyme in a crude form, which consists in first extracting with water the soluble matter contained in a mass of comminuted or broken grains of cereals from which the greater part of the starchy matter has been removed, and upon which has been developed and grown to a desired stage under suitable conditions of temperature and moisture, a fungous growth as described; and next, extracting with water the soluble matter contained in a mass of comminuted or broken grains of cereals, from which the greater part of starchy matter has been removed; next, thoroughly mixing the two extracts thus obtained, and finally concentrating the mixture by evaporation; all substantially as described.

8. As a composition of matter, diastatic enzyme in a crude form obtained by extracting with water the diastatic enzyme from a mass of comminuted or broken grains of cereals from which the greater part of starchy matter has been removed and upon which has been propagated and grown the specified fungus to the required stage of growth under suitable conditions of temperature and humidity, and which has been repeatedly used with fresh quantities of said mass, and then evaporated to a sirupy liquid or semi-solid, of yellowish brown to dark brown color, of a pleasant mushroom flavor, possessing the power of converting hydrolized starch into sugar, and differing from starch converting enzyme of germinating grain, in not giving the characteristic chemical reaction of the starch converting enzyme of germinating grain, as described.

9. As a composition of matter diastatic enzyme in a crude form composed of a mixture of extracts obtained from raw comminuted or broken grains of cereals from which the greater part of starchy matter has been removed, and from comminuted or broken grains of cereals from which the greater part of starchy matter has been removed, and upon which has been developed and grown to a desired stage under suitable conditions of temperature and moisture a fungous growth as described; the said mixture of extracts concentrated to a sirupy liquid or semi-solid form, of light brown or dark brown color of mushroom flavor, possessing the power of converting starch into sugar, giving a faint blue coloration when treated with a mixture of the solution of hydrogen peroxide and tincture of guaiacum; substantially as described.

10. As a composition of matter, diastatic enzyme, that is the soluble ferment, in the form of a solid, of light brown or yellowish white color, possessing the power of converting hydrolized starch into sugar, different from and giving a milky white coloration when treated with a mixture of a solution of hydrogen peroxide and tincture of guaiacum; substantially as described.

11. As a composition of matter diastatic enzyme in the form of a solid, of yellowish white or light brown color, soluble in water possessing the power of converting hydrolized starch into sugar and giving a faint blue coloration when treated with a mixture of hydrogen peroxide and tincture of guaiacum; substantially as specified.

12. As a composition of matter in the form of a solid of a yellowish white or light brown color, soluble in water, possessing the power of converting hydrolized starch into sugar to a degree at least equal to the starch converting power of the diastase of germinating grains, but not giving the characteristic chemical reaction of the starch converting diastase of germinating grain, except in a slight degree owing to the presence of a small quantity of the starch converting enzyme of germinating grains employed in the preparation; composed of a mixture of the precipitates from a watery solution or extract of a mass of comminuted or broken grains of cereals from which the greater part of starchy matter has been removed, and from another mass of broken or comminuted grains of cereals from which the greater part of starchy matter has been removed and upon which has been developed and grown the specified fungus to the proper stage under the proper manipulations and conditions, all substantially as described.

In testimony whereof I affix my signature in presence of two witnesses.

JOKICHI TAKAMINE.

Witnesses:
M. I. CAVANAGH,
S. E. DARBY.